April 30, 1963 A. J. PAYTAS 3,087,236
SHAFT EXTRACTOR
Filed July 28, 1961

INVENTOR.
ANTHONY J. PAYTAS

United States Patent Office 3,087,236
Patented Apr. 30, 1963

3,087,236
SHAFT EXTRACTOR
Anthony J. Paytas, 19996 Pelkey, Detroit 5, Mich.
Filed July 28, 1961, Ser. No. 127,682
1 Claim. (Cl. 29—244)

This invention relates to shaft extractors and more particularly to that type of shaft extractors used in automobile repair work and often spoken of in the trade as a rear axle puller.

It is well known to those experienced in the automotive repair arts that quite frequently the rear axle of a car or truck will be extremely tight in its housing or even rusted and thus very difficult to remove when repair is necessary. It is, therefore, one of the objects of this invention to provide a shaft extractor, the broad term for a rear axle puller, that can be adapted to pull any shaft or axle from the housing on an automotive vehicle or the like.

Another object of this invention is to provide a shaft extractor that will receive either an hydraulic screw or any other desired type of jack to give it the pulling power necessary to extract a shaft from its housing with but little effort of the person using the same.

Another object of this invention is to provide a shaft extractor having but two major parts, thus making it possible to manufacture and sell it at a low and attractive cost that is within reach of everyone who has need of automotive repair equipment.

Another object of this invention is to provide a shaft extractor that does not require adjustment other than that of the jack.

Another object of this invention is to provide a shaft extractor that can be used by even the most inexperienced person in the automotive repair arts.

Another object of this invention is to provide a shaft extractor that will extract a shaft from its housing without danger of damage to any other nearby parts of the vehicle or machine.

Still another object of this invention is to provide a shaft extractor that does not require one to heat the bearings and shaft before it can be used.

Similar reference characters refer to similar parts throughout the several views of the drawing.

Figure 1:
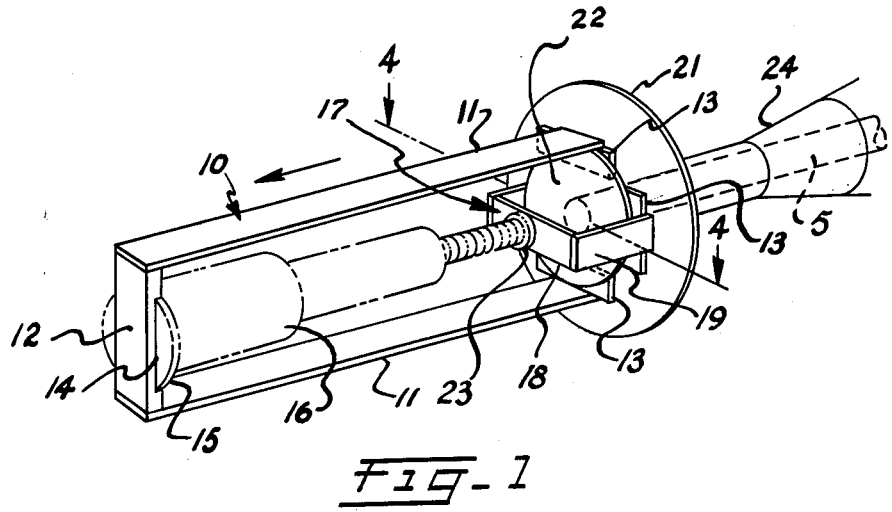
FIG. 1 is a pictorial view of this invention showing it adapted to the rear axle shaft flange of an automobile.
Figure 2:
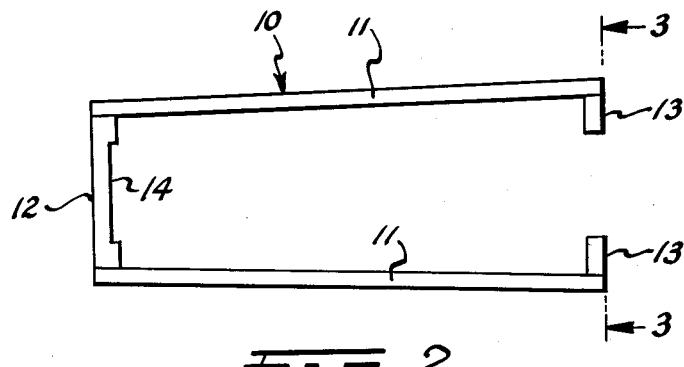
FIG. 2 is a side view of the main frame of this invention.
Figure 3:
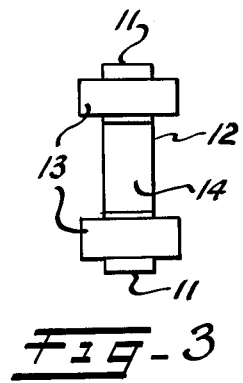
FIG. 3 is an end view of FIG. 3 taken substantially along the numerals 3—3 on FIG. 2 looking in the direction indicated by the arrows.

Having reference now to the drawing in detail, there is generally indicated by the reference character 10 a frame having the basic configuration of the letter U, and embodying a pair of side members 11 that are in parallel spaced relation to each other, and an end member 12 which I call a jack brace that is secured to the stated side members in the position clearly shown in FIGURE 1 and 2 of the appended drawing. A prong 13 is also secured to the opposite end of each one of the foresaid side members 11 from the jack brace 12 which has a recess 14 on its inward side for the reception of the base 15 of a jack 16 which is clearly shown in FIGURE 1 of the appended drawing where it will be noted that both the jack 16 and its base 15 are shown in phantom line since they are a purchased part of this invention.

Figure 4:
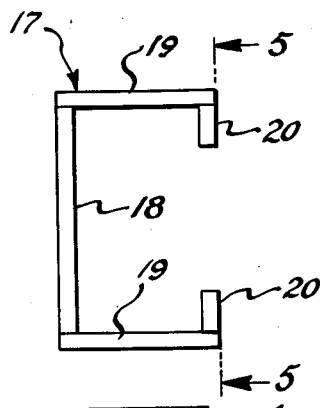
FIG. 4 is a top plan view of one detail of this invention taken as indicated by the numerals 4—4 on FIG. 1 and looking in the direction indicated by the arrows.
Figure 5:
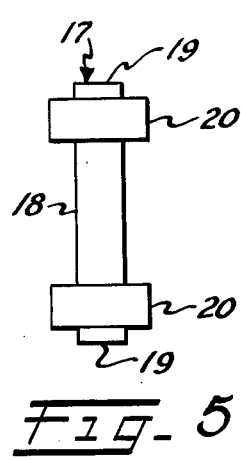
FIG. 5 is an end view of FIG. 4 taken as indicated by the numerals 5—5 on FIG. 4 and looking in the direction indicated by the arrows.

A second frame 17 which is also U shaped in configuration, embodies an end member 18, which I also call a jack brace, and a pair of side members 19 that are in parallel spaced relation to each other, one end of each side member 19 being secured to one end of the said end member 18 while the other end of each side member supports an inturned toe 20 as can be clearly seen on examination of FIGURES 1, 4 and 5 of the appended drawing.

While both frames 10 and 17 are described as being made up of a number of individual pieces all, of course, rigidly secured to one another, these two major parts of this invention may, of course, each be formed in one piece of metal or any other desired material.

It is recommended that if the frames 10 and 17 are made up of the foresaid individual parts, that they be electrically (arc) welded together.

The actual construction of this invention has now been described, and its method of use is almost self-explanatory on examination of FIGURE 1 of the appended drawing where it can readily be seen that the second mentioned frame 17 is first placed with its inturned toes 20 against the outside surface of the brake shoe support plate 21 of a vehicle or the like while the prongs 13 of the frame 10 are placed against the inside surface of the rear axle shaft flange 22, the frame 10 being at right angle to the foresaid second mentioned frame 17, as is clearly seen on examination of FIGURE 1 of the appended drawing.

The jack 16 is now placed between the two side members 11 of the frame 10 while the base 15 of the jack is resting firmly in the recess 14 of the jack brace 12 and the pad 23 of the same jack is resting firmly against one side of the end member 18 of the second described frame 17.

Continued expansion of the jack 16 (whose handle is not shown in the appended drawing) will naturally cause the frame 10 to move away from the vehicle in the direction indicated by the arrow in FIGURE 1 of the appended drawing. The movement of the foresaid frame 10 and, of course, the prongs 13, which are a part of the same, will pull outward against the rear axle shaft flange 22, thus pulling the shaft 5 which has its outer end secured to the said frame out of its housing 24.

From the foregoing it will now be seen that there is herein provided an improved shaft extractor which accomplishes all of the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

I claim:

A shaft extractor of the character described, comprising a U shaped frame embodying a pair of side members, each member of which is rectangular in both plan view and cross section, and each one of the said members being in parallel spaced relation to each other, and a jack brace rectangular in both plan view and cross section having a rectangular recess on the inside thereof adapted to receive the base of a jack placed therein, the said jack brace being at a right angle to and rigidly secured to one end of each of the said side members, a prong rectangular in plane view and cross section rigidly secured to one end of each of the said side members, a second U shaped frame smaller than the first mentioned U shaped frame and at a right angle to the first mention U shaped frame, the second said U shaped frame embodying a pair of side members each one of which is rectangular both in plan view and in cross section, each one of the said mentioned pair of side members being in parallel spaced relation to each other, and a second jack brace rectangular in both plan view and cross section being secured at right angles to the second said pair of side members to form the second said U shaped frame, and two inturned toes each one of which is rectangular in both plan form and cross section, one toe being secured to one of the second said members and the other toe being secured to the other second one of the said side members, the said prongs of the first mentioned U shaped frame being adapted to engage the inside of the rear axle shaft flange of a vehicle, the said inturned toes of the second mentioned U shaped frame being adapted engage an outside of a brake support plate connected to the axle housing of the said vehicle and a jack between the first mentioned side members and parallel to the said members, the base of the said jack resting in the said rectangular recess in the first mentioned jack brace and the other end of the said jack being adapted to press against the outside of the second mentioned jack brace that is an integral part of the second mentioned U shaped frame said jack including expanding means for outwardly moving the first mentioned U shaped frame and the said rear axle shaft flange with the said shaft secured thereto from the said housing.

References Cited in the file of this patent

UNITED STATES PATENTS

| | | |
|---|---|---|
| 1,192,611 | Field | July 25, 1916 |
| 1,504,037 | Furman et al. | Aug. 5, 1924 |
| 1,595,246 | Ragsdale | Aug. 10, 1926 |
| 1,838,738 | Bradley | Dec. 29, 1931 |